United States Patent [19]

Azzopardi et al.

[11] Patent Number: 5,273,170
[45] Date of Patent: Dec. 28, 1993

[54] RACKING SYSTEM AND METHOD FOR STORING CARTONS

[76] Inventors: Michael J. Azzopardi, 564 River Rd., Salinas, Calif. 93908; John W. Skelton, 14174 Reservation Rd., Salinas, Calif. 93908; James E. Gnesa, 646 Seneca Pl., Salinas, Calif. 93906; Gordon G. Zook, 185 Rio Verde Dr., Salinas, Calif. 93901

[21] Appl. No.: 983,892

[22] Filed: Dec. 1, 1992

[51] Int. Cl.$^5$ .............................................. A47F 5/00
[52] U.S. Cl. .................................. 211/189; 211/193; 211/191
[58] Field of Search ............... 211/189, 191, 193, 134; 414/347, 786, 281, 286

[56] References Cited

U.S. PATENT DOCUMENTS 2,971,658 2/1961 D'Altrui ............................ 211/193
3,323,655 6/1967 Foran et al. ..................... 211/191 X
3,785,502 1/1974 Konstant ......................... 211/151 X
4,117,938 10/1978 Klien ................................ 211/191
4,640,657 2/1987 Moore et al. ..................... 414/347

Primary Examiner—Robert W. Gibson, Jr.
Attorney, Agent, or Firm—Phillips, Moore, Lempio & Finley

[57] ABSTRACT

A plurality of racking systems are adapted to store palletized cartons in a refrigeration unit or the like prior to shipment of the cartons to market. Each racking system comprises laterally spaced overhead support platforms having their inner ends suitably spaced apart to provide a clearance accommodating the entrance of an extended mast of a lift truck therein. Upper groups of palletized cartons are loaded and stored on the platforms, next followed by the depositing of lower groups of palletized cartons within a lower storage space located at ground level.

17 Claims, 4 Drawing Sheets

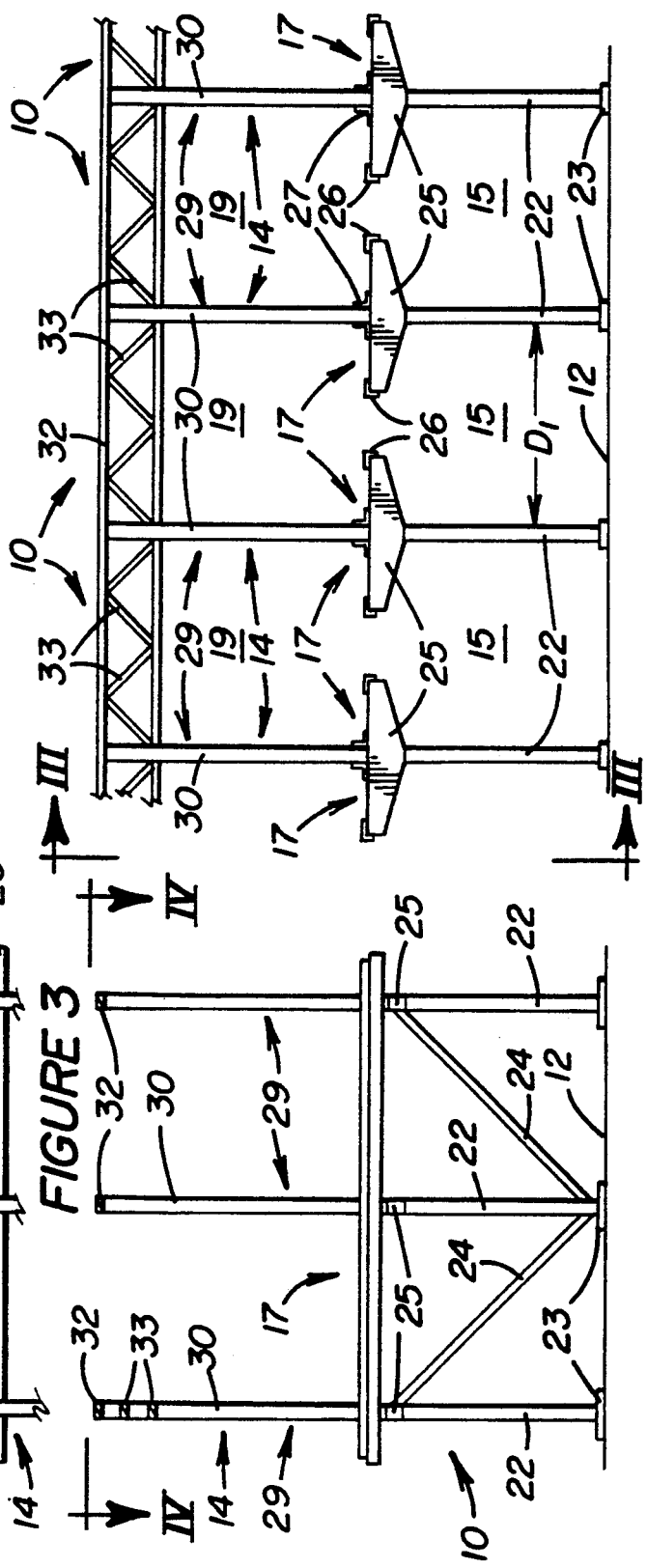
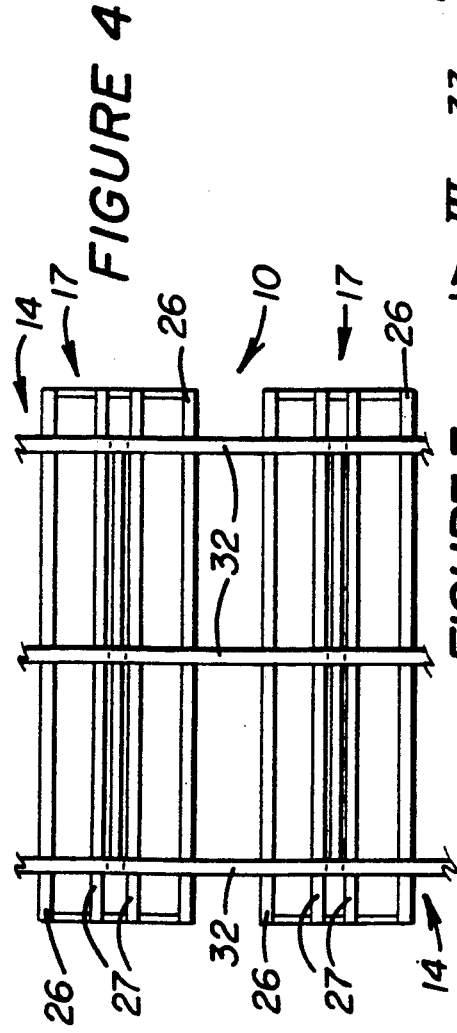
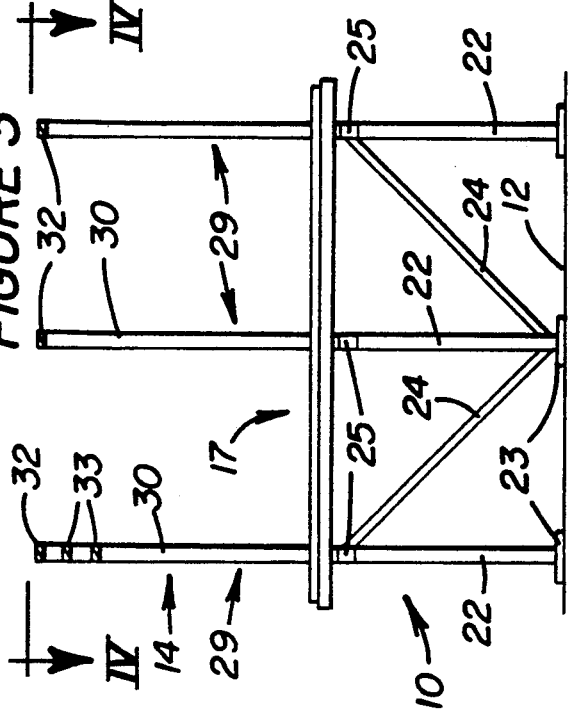

RACKING SYSTEM AND METHOD FOR STORING CARTONS

TECHNICAL FIELD

This invention relates to a system and method for storing filled cartons and, more particularly, to a racking system and method for storing palletized cartons in a refrigeration unit or the like prior to their transport to a market.

BACKGROUND ART

Head lettuce and other harvested perishable food products are normally packed into cartons at a field site. The cartons are then closed and stacked on pallets, suitably disposed on the flatbed of a truck. The palletized cartons are then delivered to a cooling facility, including a standard pre-vacuum cooling tube and a cold storage building, to maintain the product at a pre-determined low temperature (e.g., 34° F.) for preservation purposes.

It is common practice to utilize a lift truck to move the palletized cartons into the cold storage building whereat they are deposited for storage purposes. Each palletized carton stack usually constitutes six layers of cartons, with all of the palletized carton stacks being deposited directly on the cement floor of the building. Thus, substantial storage space is lost above the six-layer heights of the palletized carton stacks.

U.S. Pat. Nos. 4,640,657 and 4,900,219 disclose typical carton handling and loading systems.

DISCLOSURE OF INVENTION

This invention overcomes the above, briefly described storage problem by providing an economical and efficient system and method for substantially increasing the storage capacity of a building, adapted to store palletized cartons for subsequent shipment.

The system comprises a pair of vertically disposed and parallel side supports that are laterally spaced apart to accommodate the entrance of a lift truck therebetween, and to define a lower storage space at ground level for receiving and storing a lower group of palletized cartons therein. A pair of horizontally disposed and co-planar overhead support platforms are secured to the side supports and extend towards each other to provide a clearance at their inner ends adapted to accommodate the entrance of the extended mast of a forklift truck therein. An upper storage space is defined over the platform for receiving and storing an upper group of palletized cartons therein. Thus, the upper group of palletized cartons are adapted to be deposited by the lift truck directly onto the overhead support platforms and into the upper storage area, whereafter the lower group of palletized cartons are adapted to be deposited in the above-mentioned lower storage space.

The method of this invention essentially comprises the steps of loading a first group of palletized cartons on the forks of a lift truck, extending the mast of the lift truck to raise the first group of palletized cartons vertically above a pair of laterally spaced platforms, and moving the lift truck to position its mast in a clearance defined between the platforms and to simultaneously position the first group of palletized cartons over the platforms. Upon retracting the mast, the first group of palletized cartons are placed directly on the platforms.

BRIEF DESCRIPTION OF THE DRAWINGS

Other advantages and objects of this invention will become apparent from the following description and accompanying drawings wherein:

FIG. 2 is a front elevational view, in reduced scale, illustrating a connected series of the racking systems without the palletized cartons;

FIG. 3 is an end elevational view of the racking systems, taken in the direction of III—III in FIG. 2;

FIG. 4 is a top plan view of one of the racking systems, generally taken in the direction of IV—IV in FIG. 3;

BEST MODE FOR CARRYING OUT THE INVENTION

Figure 1:
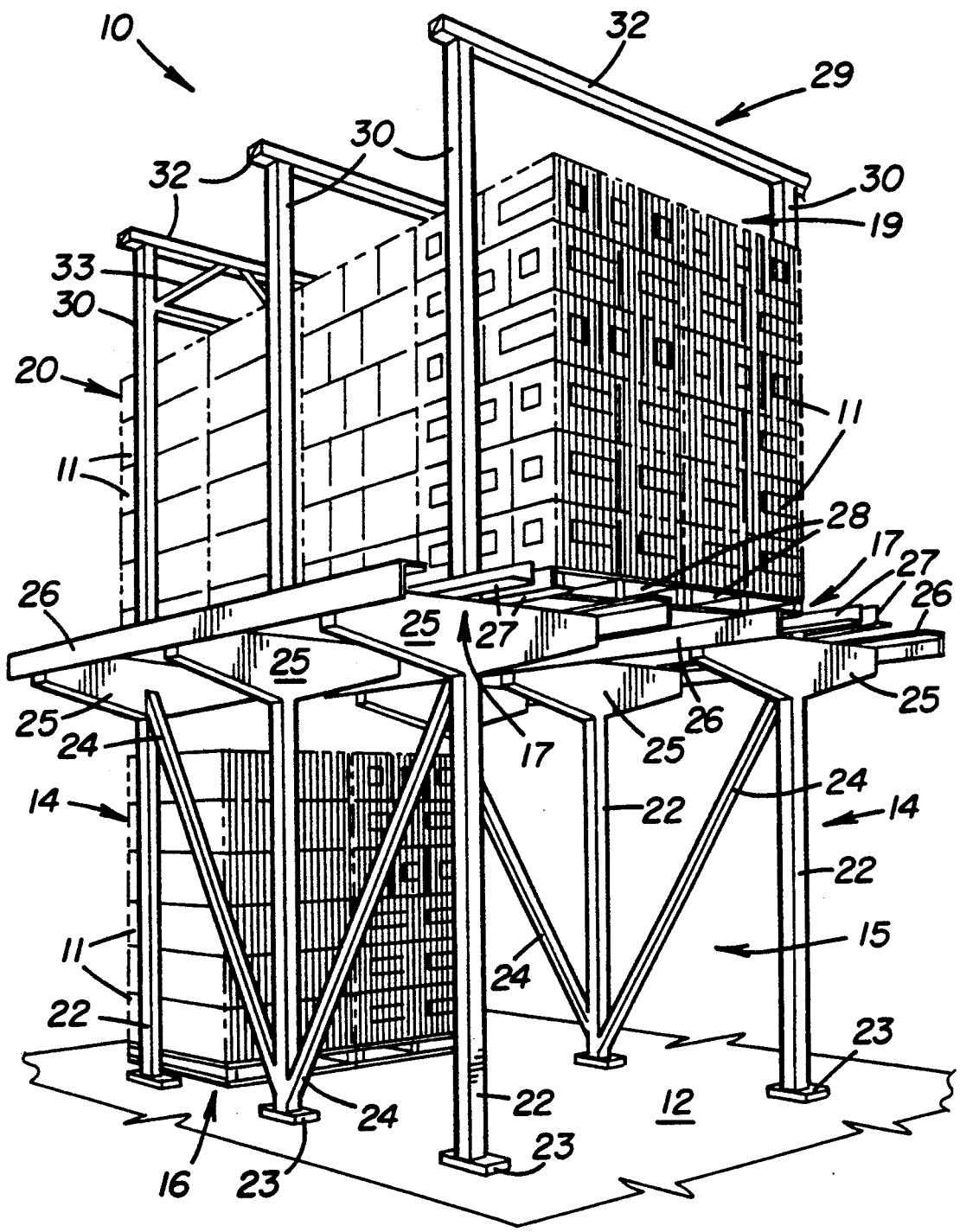
FIG. 1 is a perspective view of a racking system of this invention having upper and lower groups of palletized cartons stored therein.

FIG. 1 illustrates a racking system 10 for storing palletized cartons 11 in a refrigeration unit or the like for purposes discussed above. As shown in FIGS. 2-4, a connected series of the systems are adapted to be secured to a cement floor 12 of a building to substantially increase the storage capacity thereof over conventional storage buildings wherein six layer, palletized cartons are solely deposited on a corresponding floor. Briefly referring to FIGS. 5 and 6, a standard lift truck 13 is used with the racking system to effect the multi-tiered storage of palletized cartons in FIG. 1.

As shown in FIGS. 1-4, each racking system 10 comprises a pair of vertically disposed and parallel side supports or steel frame structures 14. As shown in FIG. 2, one of the side supports is common to a next-adjacent racking system of a connected series of racking systems. As further shown, the parallel side supports for each racking system are laterally spaced apart at a first separation distance $D_1$ to accommodate the entrance of lift truck 13 (FIG. 5) therebetween.

Figure 5:
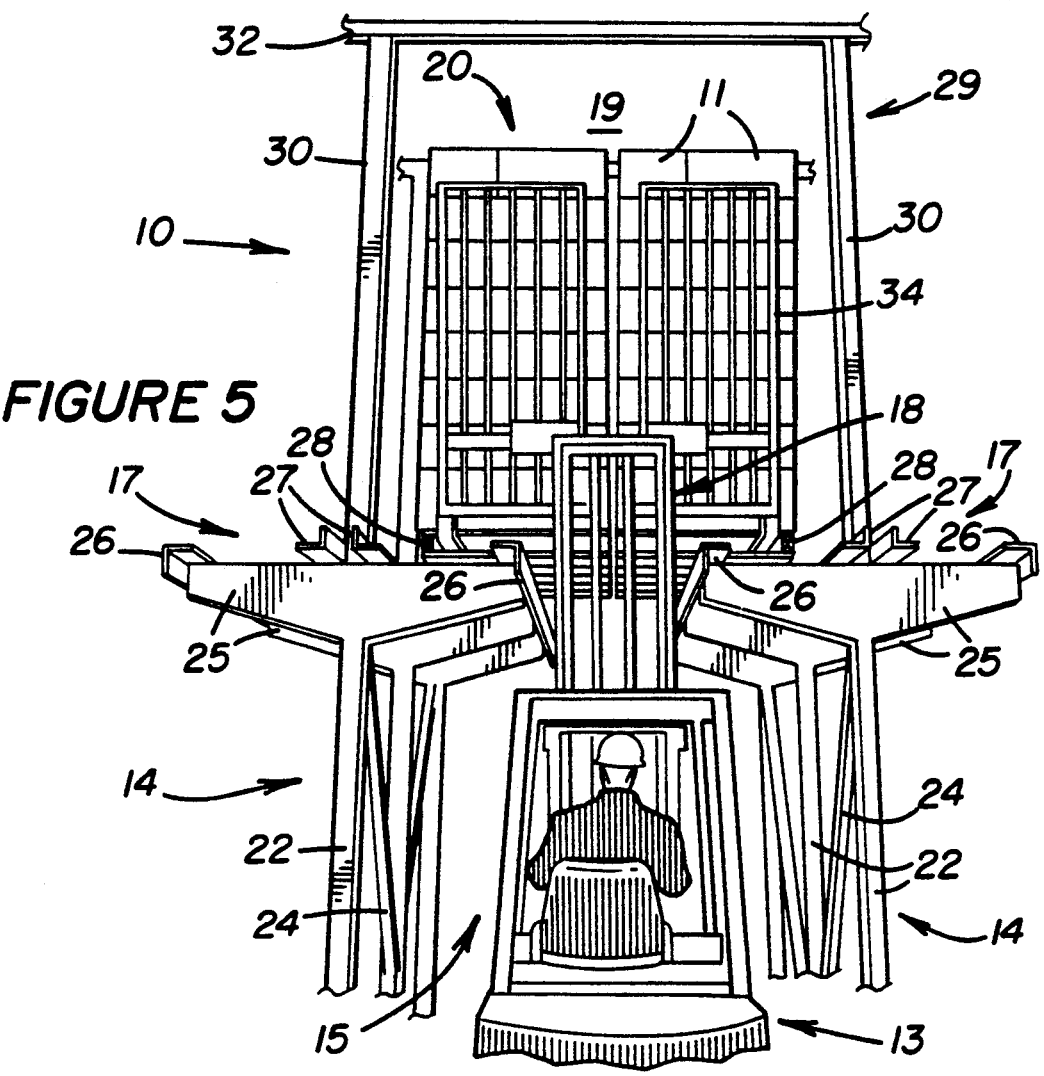
FIG. 5 is a frontal perspective view of a racking system showing the entrance of a lift truck into the system for unloading an upper group of palletized cartons on overhead platforms of the system.

As shown in FIGS. 1-3, the laterally spaced side supports of each racking system define a lower storage space 15 for receiving and storing a lower group of palletized cartons 16 therein. As described more fully hereinafter, a pair of horizontally disposed and co-planar overhead support platforms 17 each have its outer end secured to a respective one of the side supports to extend towards the other platform. Briefly referring to FIG. 7, the inner ends of the laterally adjacent platforms terminate short of each other in spaced-apart relationship to define a second separation distance and clearance $D_2$. Such clearance will accommodate the entrance of a vertically extended mast 18 of lift truck 13 therein and between the platforms (FIG. 5). An upper storage space 19 is defined over platforms 17 for receiving and storing an upper group of palletized cartons 20 therein, normally stacked to a height of at least fifty-five inches.

Referring again to FIGS. 1–4, each side support 14 of each racking system 10 comprises a plurality of vertically disposed and longitudinally aligned posts 22. Each longitudinally aligned post terminates at its lower end at an anchor plate 23, adapted for securance to floor 12 of the storage building. In the embodiment illustrated, three equally spaced posts 22 are utilized, with each adjacent pair of posts being secured together by a diagonally disposed brace 24. The upper end of each post terminates at a T-shaped upper support member 25, with the support members collectively forming, in part, platforms 17.

Each platform 17 further comprises an elongated inner member or runner 26 secured to the distal ends of longitudinally spaced upper support members 25 to define an inner side of a respective platform 17. An elongated outer member or runner 27 is secured intermediate the lateral ends of a respective upper support member 25. As more clearly shown in FIGS. 5 and 7, members 26 and 27 are in the form of steel angles suitably positioned to provide horizontally disposed upper surfaces adapted to support and guide the underside of a respective pallet 28 thereon.

A rectangular frame structure 29 is integrally secured on side supports 14 and is disposed vertically above each adjacent pair of laterally spaced platforms 17. In the embodiment illustrated, each frame structure comprises a pair of laterally spaced upper posts 30 (which may form extensions of posts 22) positioned in vertical alignment with respective lower posts 22 comprising side supports 14. The longitudinally spaced frame structures thus define upper storage space 19 with each pair of laterally spaced upper posts 30 being capped by a removable reinforcement rail 32, if so desired. As shown in FIGS. 1 and 2, the rearward-most pair of upper posts 30 and respective reinforcement rail 32 may be secured together by a girder formed by a plurality of suitably arranged reinforcement struts 33 welded or otherwise suitably secured in position.

Figure 6:
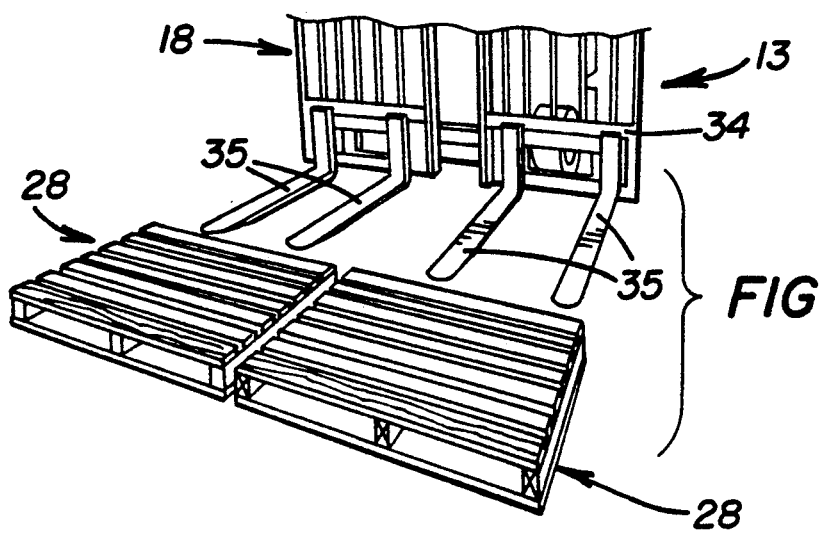
FIG. 6 is a perspective view partially illustrating the forks of the lift truck as they would appear prior to their entrance into a pair of pallets adapted to have filled cartons stacked thereon.

FIGS. 5 and 6 partially illustrate lift truck 13 and a pair of standard pallets 28 (FIG. 6), each adapted to have six layers of standard cartons 11 stacked thereon. Telescoping and extendable mast 18 has a standard carriage 34 reciprocally mounted thereon in a conventional manner, whereby selective extension of the mast and lifting of the carriage on the mast, under control of the operator of the lift truck, will lift the palletized cartons from ground level to a position above overhead platforms 17. Forwardly projecting forks 35 are mounted in a conventional manner, forwardly on carriage 34, and are adapted to engage within pallets 28 for lifting and lowering purposes, as is well known to those skilled in the art.

Figure 7:
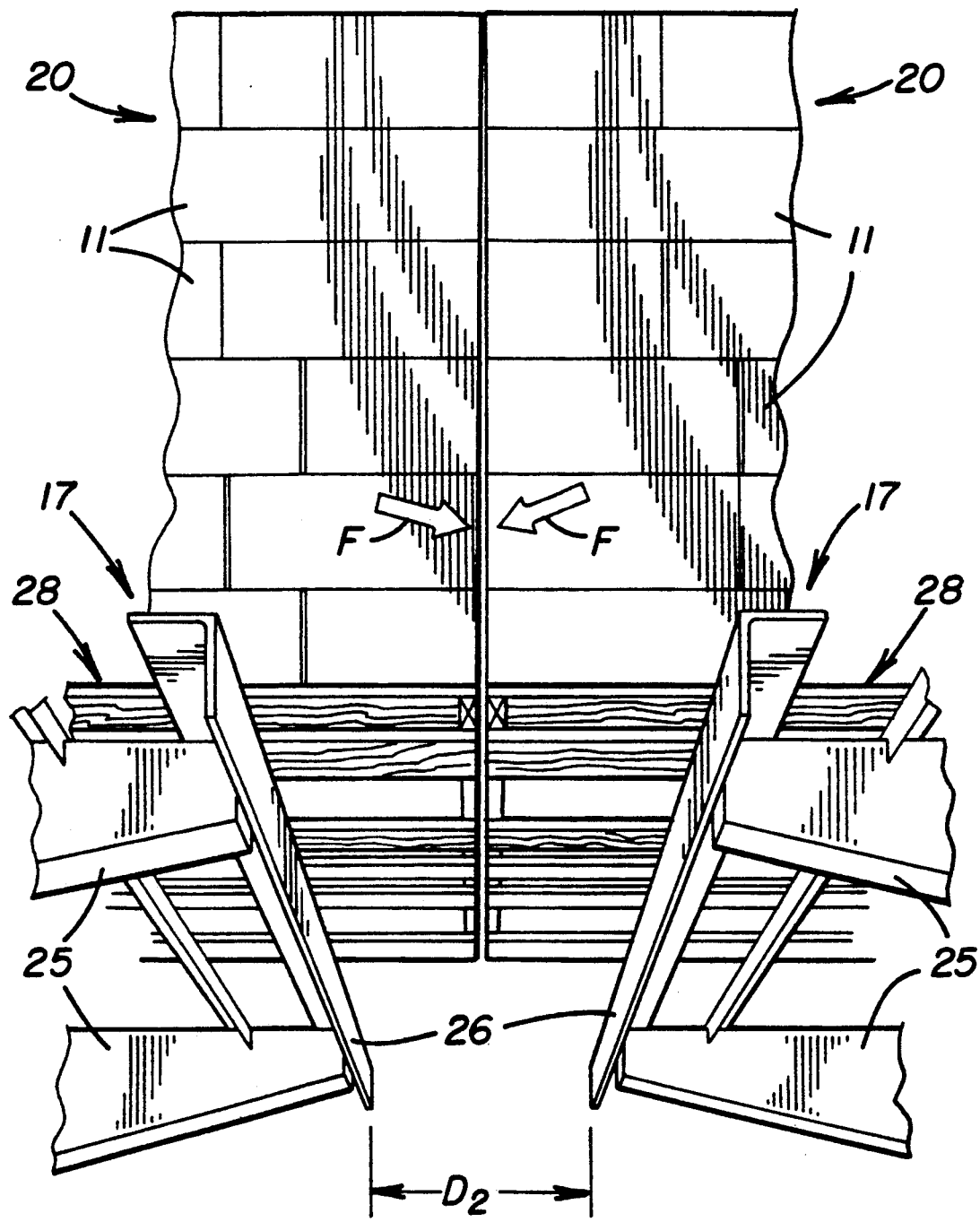
FIG. 7 illustrates the disposition of the upper group of palletized cartons on the overhead platforms.

In carrying forth the method of this invention, the lift truck operator will move forks 35 of lift truck 13 into a pair of pallets 28 (FIG. 6) on which a group of cartons are stacked. Loading of the upper group of palletized cartons 20 on the forks of the lift truck is followed by extending mast 18 to raise such group vertically above laterally spaced platforms 17 (FIG. 5). As shown in FIG. 7, inner members 26 are spaced apart at distance $D_2$ to accommodate the entrance of extended mast 18 in the clearance defined between the members.

After the lift truck has been moved to position its mast in such clearance and between the platforms, the upper group of palletized cartons are simultaneously positioned over the platforms, as shown in FIG. 5. The upper group of palletized cartons preferably comprises a pair of separate palletized six-layer carton groups, each stacked on a respective pallet 28. When the palletized cartons are properly positioned over the platform, the mast of the lift truck is retracted to engage the pallets with the upper surfaces of inner and outer rail members 26 and 27.

The operation is repeated to thus place multiple upper groups of palletized cartons in upper storage space 19 of a respective racking system 10. After such loading is completed, the lift truck can then fill lower storage space 15 with groups of palletized cartons 16. The operation is repeated for each adjacent racking system (FIG. 2). It should be noted in FIG. 7 that each pallet 28 overhangs a respective platform 17. Due to gravity, wedging forces F are created to firmly hold the cartons in place.

From the above description, it will be appreciated by those skilled in the art that racking system 10 and the method of this invention provide desiderata not found with respect to conventional storage systems and methods. For example, the system's rigid steel construction exhibits no moving parts to wear out and is unaffected by low storage temperatures (e.g., 34° F.). The various components of the system can be made detachable to provide a modular system that can be expeditiously set up and taken down. The uniqueness of the system further provides for the set-up of multiple racking systems within minimum space requirements at particular fresh vegetable pre-cooling and cold storage facilities.

The unique construction of the system lends itself to the utilization of two or more piggy-back type bins to accommodate two or more multiple pallet groups (FIG. 5) for each system. Otherwise stated, each modular system can be sized-up or sized-down to accommodate the storage requirements of a particular seasonal crop, and the horizontal plane of platforms 17 can be adjusted to any desired vertical height. The two-pallet overhead loading capability of left truck 13 doubles the cyclic loading capabilities of the truck over a standard system/method wherein only a single palletized load is placed on an overhead rack. This invention also provides for the use of pallets (even most damaged ones) having varied sizes (length, width and/or height) and pallets composed of soft or hard wood materials.

We claim:

1. A racking system for storing multiple pairs of palletized cartons, each pair of palletized cartons comprising a pair of horizontally disposed and side-by-side pallets each having a separate group of cartons stacked thereon, in a refrigeration unit or the like with the use of a lift truck having an extendable mast, a reciprocal carriage mounted on said mast, and forwardly projecting forks mounted on said carriage and adapted to engage within the pair of pallets of a respective pair of said palletized cartons, said racking system comprising a pair of vertically disposed and parallel side supports being laterally spaced apart at a lower separation distance to accommodate the entrance of said lift truck and a pair of said palletized cartons therebetween and to define a lower storage space for receiving and storing a lower group of pairs of said palletized cartons therein, and a pair of horizontally disposed and co-planar overhead support platform means each having an outer end thereof secured to a respective one of said side supports in cantilevered relationship thereon and extending towards the other platform means, inner ends of said pair of platform means terminating short of each other in spaced-apart relationship to define a second separation distance and clearance to accommodate the entrance of the vertically extended mast of said fork lift truck therein and for defining an upper storage space over said platform means for receiving and storing an upper group of palletized cartons therein, each of said platform means being sized and positioned to support a respective one of said pair of palletized cartons in overhanging relationship thereon for permitting the cartons of said pair of palletized cartons to wedge against each other under the influence of gravity to firmly hold the cartons in place on said pair of platform means.

2. The racking system of claim 1 wherein said first separation distance is greater than the width of said lift truck.

3. The racking system of claim 2 wherein said second separation distance is greater than the width of said mast.

4. The racking system of claim 1 wherein said side supports each comprise a plurality of vertically disposed and laterally spaced pairs of posts and wherein each said platform means comprises a support member secured on each said post and sized to partially support a respective one of said pair of palletized cartons thereon.

5. The racking system of claim 4 wherein each said platform means comprises an elongated inner rail member secured to inner ends of a series support members.

6. The racking system of claim 5 wherein each said platform means further comprises an elongated outer rail member secured to outer ends of said series of support members, adjacent to said posts.

7. The racking system of claim 4 wherein said side supports each further comprises a diagonal brace secured between an upper end of one of said posts and a lower end of a next adjacent post one of said posts.

8. The racking system of claim 4 further comprising a frame structure secured on and above said side supports and defining said supper storage space therein.

9. The racking system of claim 8 wherein said frame structure comprises an upper post disposed in vertical alignment with each of said first-mentioned posts.

10. The racking system of claim 9 wherein said frame structure further comprises a reinforcement bar secured to upper ends of each laterally spaced pair of said upper posts.

11. The racking system of claim 1 wherein a plurality of said racking systems are secured together in side-to-side relationship relative to each other.

12. A method for storing a pair of palletized cartons, comprising a pair of horizontally disposed and side-by-side pallets each having a separate group of cartons stacked thereon, in a refrigeration unit or the like with the use of a lift truck having an extendable mast, a reciprocal carriage mounted on said mast and a plurality of laterally spaced and forwardly projecting forks mounted on said carriage and adapted to simultaneously engage within said pair of pallets having said carton stacked thereon, said method comprising the steps of loading said pair of palletized cartons on the forks of said lift truck, extending the mast of said lift truck to raise said pair of palletized cartons vertically above a pair of laterally spaced platforms, defining a clearance therebetween sized to accommodate the entrance of said mast therein, moving said lift truck to position said mast in said clearance and between said platforms and to simultaneously position said pair of palletized cartons over said platforms, retracting said mast, and simultaneously depositing said pair of palletized cartons on said platforms.

13. The method of claim 12 wherein said depositing step comprises positioning said pair of palletized cartons to overhang said clearance to permit the adjacent cartons of said pair of palletized cartons to engage each other under the force of gravity.

14. The method of claim 12 further comprising depositing a separate, lower group of palletized cartons in a storage space defined below said platforms.

15. The method of claim 14 wherein said last-mentioned depositing step comprises depositing said lower group of palletized cartons at ground level.

16. The method of claim 12 wherein all of said method steps are repeated to deposit another pair of palletized cartons on a second pair of said platforms, next adjacent to said first-mentioned platforms.

17. A racking system for storing palletized cartons in a refrigeration unit or the like with the use of a lift truck having an extendable mast, a reciprocal carriage mounted on said mast, and forwardly projecting forks mounted on said carriage and adapted to engage within pallets having carton stacked thereon, said racking system comprising a pair of vertically disposed and parallel side supports being laterally spaced apart at a lower separation distance to accommodate the entrance of said lift truck therebetween and to define a lower storage space for receiving and storing a lower group of palletized cartons therein, and a pair of horizontally disposed and co-planar overhead support platforms each having an outer end thereof secured to a respective one of said side supports and extending towards the other platform, inner ends of said platforms terminating short of each other in spaced-apart relationship to define a second separation distance and clearance to accommodate the entrance of the vertically extended mast of said fork lift truck therein whereby an upper storage space is defined over said platforms for receiving and storing an upper group of palletized cartons therein, said side supports each comprising a plurality of vertically disposed and laterally spaced pairs of posts and wherein said support platforms each comprises a support member secured on each said post and sized to partially support a group of palletized cartons thereon, each said support platform comprising an elongated inner rail member secured to inner ends of a series of said support members.

* * * * *